Jan. 14, 1969     G. A. R. ÖJELID     3,422,239
APPARATUS FOR TREATING ARTICLES WITH MICROWAVE ENERGY
Filed Sept. 9, 1965
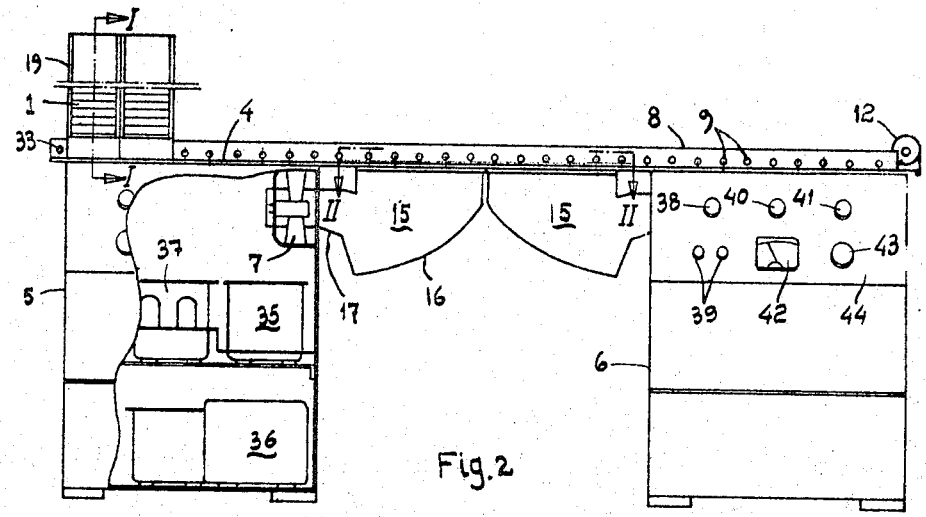
Fig. 2
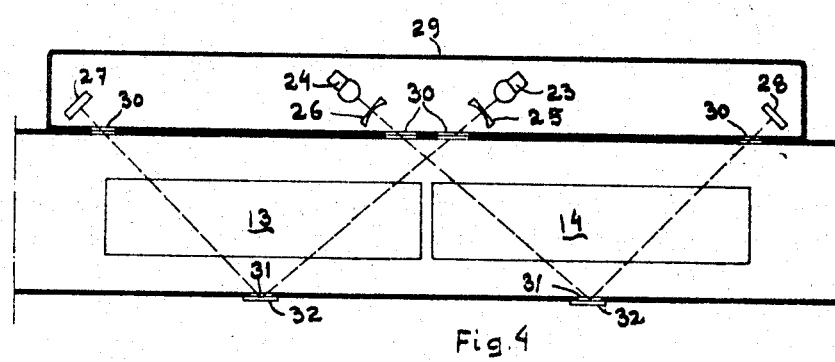
Fig. 4
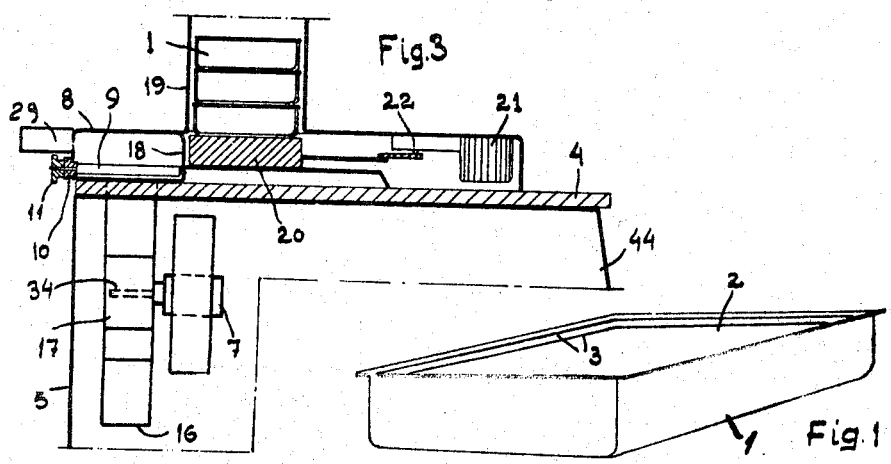
Fig. 3
Fig. 1

United States Patent Office 3,422,239
Patented Jan. 14, 1969

3,422,239
APPARATUS FOR TREATING ARTICLES WITH MICROWAVE ENERGY
Göran Axel Runo Öjelid, Huskvarna, Sweden, assignor to Husqvarna Vapenfabriks Aktiebolag, Huskvarna, Sweden
Filed Sept. 9, 1965, Ser. No. 486,054
U.S. Cl. 219—10.55                     8 Claims
Int. Cl. H05b 9/06; H05b 5/00

ABSTRACT OF THE DISCLOSURE

Apparatus for treating articles with microwave energy, particularly for producing hot food portions and including a microwave tunnel oven with a longitudinal slot in the tunnel bottom, means for conveying articles through the oven and a microwave generator, a waveguide and a reflector arranged below said conveying means and guiding microwave energy into the oven through said slot, with said tunnel being accommodated on a slab or base which carries on its underside the irradiation means.

---

The invention relates to an apparatus for treating articles with microwave energy and particularly for producing hot food portions from different constituents of food portions previously prepared, packaged in portions in flat containers of non-metallic material, closed, frozen and stored. The final part of this storage being in an eating place, where immediately before serving a food portion, containers corresponding to this portion with the constituents of the portion are thawed out and heated by means of microwave energy. This arrangement makes possible co-ordinated production, storage and serving of ready-prepared food in portion form. Each portion is packaged in several containers varying in content, for instance one container with meat or fish and sauce, another container with potatoes and/or vegetables and possibly a third container with other vegetables. The containers may be filled, sealed and frozen at the time of year and at the place which are most suitable for the particular food-stuffs; veal has its own proper time, fish has its time and place, vegetables have different times and places, and similarly with potatoes, etc. It is only for the first time in the shop or eating place that these various foodstuffs need to be brought together, which in accordance with the invention takes place in handy frozen form and can be effected in any combination desired. By making use of the possibilities of rapid thawing out and heating, which are offered by microwave energy particularly for foodstuffs, serving of food portions in spite of their above-mentioned distribution can be carried out quickly and at any time of day independently of cooks and kitchens.

Known microwave ovens are however little suited to this purpose. Muffle ovens in which food portions can be inserted through a flap and to which microwave energy can be fed after the flap is closed, take up too much time and energy, among other things, particularly with a large number of portions. Known tunnel ovens which contain a part of a conveyor belt for conveying dishes with food portions through a tunnel under radiation with microwaves electrically polarised substantially in the longitudinal direction of the tunnel, have an unsatisfactory distribution of energy in the tunnel cross-section and are charged with microwave radiation from the ends of the tunnel that is open for the passage of the conveyor belt and, secondarily also from the belt.

The invention thus relates therefore to a microwave apparatus particularly suitable for the above-mentioned heat treatment but without the above-mentioned disadvantages. This apparatus is particularly characterised by a metal tunnel oven with a longitudinally extending slot in a central part of the bottom between the ends of the tunnel, means, preferably of non-metallic material, for conveying successive articles through the tunnel oven, at least one microwave generator for the oven and means connected to the generator and to the slot for irradiating microwave energy in the tunnel with electric polarisation substantially at right-angles to the longitudinal direction of the slot and the tunnel.

The invention will be described in more detail in what follows in connection with the attached drawing, where FIGURE 1 shows in perspective a food container substantially parallelepipedal, FIGURE 2 shows diagrammatically from the front and partly in section an apparatus for thawing out and heating such containers, and FIGURES 3 and 4 are sections along the lines I—I and II—II respectively of FIGURE 2.

The container is substantially rectangular in plan and its depth does not exceed ¼ of the wavelength of the microwave energy to be used for thawing out the contents, as experience shows that the possibility of penetration of microwaves into foodstuffs justifies such a limit. The width of the container is adapted to the apparatus for thawing out the containers, 95 mm. having been found suitable for the wavelength of 12 cm. The length of the container is substantially of no importance from the point of view of microwave technique, but space requirements for meat with sauce and for potatoes justifies however lengths of 10–12 cm. A particularly suitable material for the container is low pressure polyethylene, which can be moulded with well rounded corners and can easily be welded to a cover 2 of the same material or of paperboard lined therewith. In the latter case the container can be opened without any special tool, in particular if a pair of parallel pressings 3 are provided in the paperboard to form a tear indication. The container should be at least nearly filled, and sealed moisture-tight and air-tight.

The apparatus in FIGURE 2–4 comprises a slab or table 4, which is supported by a pair of sheet metal cupboards 5 and 6. Each contains a microwave generator 7 and transformers 35, 36, a rectifier 37, regulators, relays and other means known per se for operating the generators which may be the magnetron type, but may also be of a different type. Each cupboard has a control panel 44 with a main current or line voltage switch 38, on and off switching devices 39, cathode incandescence current regulator 40, anode voltage regulator 41, anode current indicator 42 and anode current regulator 43. On the slab 4 is mounted a tunnel in the form of a metal tube 8 of rectangular cross-section. The width of the cross-section is suitable for the width of the container in FIGURE 1, should deviate considerably from even multiples of a quarter of the microwavelength used and is preferably smaller than this wavelength, while the depth exceeds a quarter of the wavelength used, by so much that a row of transversely placed conveyor rolls 9, placed near the bottom of the tube, leave free therein a height of somewhat more than a quarter of a wavelength. The rolls are made of synthetic plastic material, for instance low pressure ethylene, and are supported with metal trunnions in the sides of the tube. The periphery of the tube is fully metallically sealed for reasons of microwave technique, but the rolls 9 are inserted from one side through sufficiently large holes, which after the insertion are closed with metal bearing brushes 10. The trunnion of each roll going through the bush 10 carries a sprocket 11 for a driving chain not shown, which synchronises the rolls 9, so that these can be set altogether in rotation in the same direction by means of an electric motor 12, FIGURE 2, whose speed is controllable if requisite and which is started by closing a main current switch of the apparatus. The rolls 9 are spaced apart at a center distance of about 3 cm. and are arranged for rotation clockwise, as seen in FIGURE 2.

The bottom of the tube or tunnel 8 is provided in the middle of its length with a longitudinally extending slot consisting of two like parts 13, 14, which slot is located symmetrically in the bottom of the tube and is covered by a disc (not shown) of poor-loss synthetic plastic material, e.g. polyester. Connected to each slot part 13, 14 with a good metallic connection is a microwave radiator 15 known per se with a semiparabolic side 16. The radiator 15 is connected to the antennae 34 of the generator 7 by a waveguide 17, at whose opening the focus of the side 16 is placed, from which side the microwaves are reflected into the tube 8 where a standing wave motion is sought. The width of the radiator and the slot 13, 14 should not exceed half the wavelength. The position and form of the slot 13, 14 determine that a minimum of microwave energy is propagated in the direction of the ends of the tube 8, and that the irregularity in the field strength which semiparabolic radiators tend to have at the opening, become essentially unimportant, as they occur in the passage direction of the tube 8. In FIGURE 4 rolls 9 (not shown) are also placed above the slot 13, 14. The material in the rolls 9 permits in this connection a substantially loss-free irradiation from the slot on food containers according to FIGURE 1, carried by the rolls. The position of the slot 13, 14 at the middle of the length of the tube and the position of the rolls means that any possible secondary radiation from the rolls 9 and food containers 1 is effectively dampened, before it reaches the ends of the tube.

Near the left hand closed end of the tube 8, seen in FIGURE 2, there is a rectangular aperture 18 in the right hand side of the tube, as seen in FIGURE 3. The aperture is somewhat more than ¼ of a wavelength high and is located above the rolls 9. Its length corresponds at least to the length of the largest food containers in FIGURE 1. In front of the aperture 18 is fitted a stack type magazine 19. Below the magazine 19 is fitted a feed device in the form of a piston 20 movable at right angles to the longitudinal direction of the tube 8 and of the magazine 19. The piston is coupled to a motor 21 through a crank or eccentric device 22 in order to impart to it a reciprocal motion. The height of the piston 20 is somewhat less than the height of the food containers and its length in the direction of movement substantially corresponds to the width of the contaniers. The travel length is so selected that the piston lies in its one end position against the tube 8 and substantially covers its aperture 18, and in its opposite end position frees the bottom of the magazine 19, so that the lowest of the containers therein accommodated sinks in front of the piston. According to FIGURE 2 the magazine 19 is duplicated, and therefore also the aperture 18, the piston 20, the motor 21 and the device 22 are duplicated. By this one magazine can be reserved for containers with meat or fish with sauce and the other magazine for containers with potatoes or vegetables. The movements of the pistons should here be so controlled that the other piston does not tend to introduce a container while a container introduced by the first piston 20 is located in front of the other piston. If desired the tube can be provided with means, e.g. an undriven sloped roller track in a sloped part of the inlet end part of the tube, in order to feed together the containers inserted to form an uninterrupted row, before they reach the slot 13, 14. The number of magazines may advantageously also be greater than two, so that different dishes are accessible at will from the various magazines.

At one side of the tube 8, near the slot 13, 14 is an optical sensing device for automatization of the work of the microwave generators. In FIGURE 4 is consists of two incandescent bulbs 23, 24 together with focussing lenses 25, 26 and two light-sensitive semiconductor elements 27, 28 of known type, all assembled in a box or housing 29, which is properly closed with the exception of four holes 30. The box is mounted tightly on the tube 8, so that the holes 30 properly coincide with four corresponding holes (possibly provided with windows) in one side of the tube. In the opposite side of the tube are two holes 31, which, however, are each covered on the outside with a small mirror 32. It can easily be seen from FIGURE 4 that by this device light beams from the incandescent bulbs 23, 24 can be reflected by the mirrors 32 and find the elements 27 or 28, on the assumption that the light beam is not interrupted by an object in the tube 8. The device is therefore suitable to control the generators in such a way that they only work when at least one food container is located in the path of one of the light beams, i.e., above the slot 13, 14 which is essential for operational economy and working of the generators.

FIGURE 2 also shows a nipple 33, which is connected to the tube 8 near its closed end. The nipple serves to connect an ordinary water flexible tube for the purposes of swilling out the tube 8 and the rolls 9 with hot water and detergents.

The handling of the apparatus comprises filling the magazines 19 with frozen stored food containers, actuating the current switches of the two cupboards 5 and 6, and supplying the motor 21 or its counterpart with an impulse for introducing containers in the desired combination in the tube 8. The rolls 9 then catch up the containers and impel them through the tube at a speed determined by their drive motor 12. When the containers interrupt the first light beam at the middle part of the tube, the light-sensitive element 27 gives the starting signal to the appropriate microwave generator 7, which receives anode current and immediately begins to radiate microwave energy into the container through the slot-part 13. In known manner the microwave energy is converted into heat in the contents of the container, which is thawed out and heated. The generator continues its work until the last container has cleared the path of the light beam, upon which the element 27 gives the generator a stop signal. The other generator in the cupboard 6 acts in the same way, but with a certain time lag, as it is controlled by the element 28. The right end of the tube 8 is connected to a driven conveyor belt (not shown), a sloped, possibly forwardly directed roller track or the like for receiving and collecting the ready-treated containers.

Typical data for an apparatus of this kind are:
  Microwave capacity: 2×5 kw.
  Conveyor speed: 0.5–2 metres per minute.
  Capacity: 200–800 containers per hour.

The possibility of rinsing the tube 8 with hot water is of essential hygienic importance, as vapour generation in the containers during the heating thereof often opens the cover and gives rise to fat deposits on the inside of the tube and on the rolls.

Other forms of embodiment also come within the scope of the invention. For instance a single microwave generator can be used, or the slot components 13, 14 can be arranged symmetrically side by side. In order further to reduce radiation of microwave energy at the discharge aperture of the tunnel, this may be provided with a known blocking or damping filter between the slot and discharge aperture, or, preferably, this aperture is provided with a peripheral flange, whose height is ¼ wave length and a correspondingly large flap arranged in front of this, which is held open by an electromagnet, while a contact device controlling the magnet and arranged partly in the path of travel of the containers in the tunnel near the outlet end, is actuated by an emergent container. Again, two tunnels with their associated members can be placed adjacent to one another, one for containers with meat or fish, the other for different vegetables. The feed of containers from the magazines can be program-controlled for example by means of a known programing mechanism with a free choice of programs. An apparatus in accordance with the invention can also be used for heat treatment of other articles, e.g. for thawing out bread or pastry, or fermenting dough or foamed plastic masses, or for drying wooden components or tobacco.

What I claim is:

1. Apparatus for treating articles with microwave energy comprising a metal tunnel including top, bottom and side walls, said bottom wall having a slot in the mid portion thereof extending longitudinally of a substantial extent of said tunnel, conveying means within the tunnel for conveying successive articles through said tunnel and below said slot and conveying means at least one microwave generator, a waveguide, and a radiator connected in series to said generator, said radiator including a reflector reflecting radiated microwave energy from said generator upwards through said slot with the electrical polarization thereof substantially at right angles to the longitudinal direction of the slot and tunnel.

2. Apparatus as claimed in claim 1 in which said slot is arranged symmetrically in the bottom wall of said tunnel, said tunnel being rectangular in cross-section and having a width deviating considerably from even multiples of ¼ of the microwave length used and being smaller than the wave length.

3. Apparatus as claimed in claim 2 in which the depth of said tunnel above the conveying means is slightly in excess of ¼ of the wave length.

4. Apparatus as claimed in claim 2 in which one side wall of the tunnel has at least two longitudinally spaced openings therein located above the level of said conveying means and alongside said slot, and a sensing means for controlling said microwave generator comprising a light beam source and a photoelectric cell positioned at said openings, and the other side wall having a mirror therein directed to reflect the light beam from said source to said cell whereby said beam is interupted by articles approaching and leaving the area of said slot.

5. Apparatus as claimed in claim 1 in which said tunnel has an inlet end, the side wall adjacent the inlet end having a feed opening therein at a level to extend above said conveying means, means adapted to accommodate a vertically arranged stack of articles to be treated alongside said feed opening, a reciprocable piston mounted to reciprocate beneath said stack and toward and away from said feed opening, and means for so reciprocating said piston to move the lowermost article in such a stack through said feed opening and into said conveying means.

6. Apparatus as claimed in claim 5 in which said piston is so dimensioned relative to said feed opening as to substantially close said opening in its end position of reciprocation toward said tunnel.

7. Apparatus as claimed in claim 1 in which said tunnel has an outlet end, a movable flap for closing and opening said outlet end, electro-magnetic means for actuating said flap to open position, and a switch means for controlling said electro-magnetic means, located in said tunnel in the path of travel of articles and at a position adjacent said outlet.

8. Apparatus as claimed in claim 1 and further including at least one cabinet structure housing said microwave generator, and a table on said cabinet and extending laterally thereof for supporting said oven and said waveguide and radiator extending between said cabinet and table and said radiator including walls connected to said slot.

References Cited

UNITED STATES PATENTS

| 2,009,856 | 7/1935 | Otis et al. | 250—219 |
| 2,602,185 | 7/1952 | Johnson | 250—223 X |
| 3,139,915 | 7/1964 | Minard | 250—223 X |
| 3,263,052 | 7/1966 | Jeppson et al. | 219—10.55 |
| 3,281,567 | 10/1966 | Meissner et al. | 219—10.55 |
| 3,321,314 | 5/1967 | Jeppson | 219—10.55 X |
| 3,335,656 | 8/1967 | Smith | 219—10.55 X |

OTHER REFERENCES

German printed application, 1,186,570, February 1965.

RICHARD M. WOOD, *Primary Examiner.*

L. H. BENDER, *Assistant Examiner.*

U.S. Cl. X.R.

219—10.69